(12) United States Patent
Merchant et al.

(10) Patent No.: US 8,990,221 B2
(45) Date of Patent: Mar. 24, 2015

(54) DEVICE AND METHOD FOR UPDATING A CERTIFICATE

(75) Inventors: Kashyap Merchant, Santa Clara, CA (US); Sanjiv Maurya, Fremont, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 1605 days.

(21) Appl. No.: 12/237,023

(22) Filed: Sep. 24, 2008

(65) Prior Publication Data

US 2009/0299972 A1 Dec. 3, 2009

Related U.S. Application Data

(60) Provisional application No. 61/057,692, filed on May 30, 2008.

(51) Int. Cl.
*G06F 7/00* (2006.01)
*H04L 29/06* (2006.01)
*H04L 29/12* (2006.01)

(52) U.S. Cl.
CPC ....... *H04L 63/0823* (2013.01); *H04L 29/12084* (2013.01); *H04L 61/1523* (2013.01)
USPC ...................................................... 707/748

(58) Field of Classification Search
USPC .............................................. 707/748, 712
See application file for complete search history.

(56) References Cited

U.S. PATENT DOCUMENTS

| | | | |
|---|---|---|---|
| 2004/0093493 A1* | 5/2004 | Bisbee et al. | 713/156 |
| 2005/0123141 A1* | 6/2005 | Suzuki | 380/277 |
| 2006/0112419 A1 | 5/2006 | Brown et al. | |
| 2006/0294576 A1 | 12/2006 | Cross et al. | |
| 2007/0038704 A1 | 2/2007 | Brown et al. | |
| 2007/0260877 A1* | 11/2007 | Adams et al. | 713/156 |
| 2008/0066168 A1* | 3/2008 | Gregg et al. | 726/7 |

OTHER PUBLICATIONS

Garg et al., "Wireless Access Server for Quality of Service and Location Based Access Control in 802.11 Networks," Proceedings of the Seventh International Symposium on Computers and Communications (ISCC'02), Jul. 2002, pp. 819-824.

* cited by examiner

*Primary Examiner* — Truong Vo
(74) *Attorney, Agent, or Firm* — Fox Rothschild LLP

(57) ABSTRACT

A method updates certificates for potential recipients. The method comprises determining whether the certificates require updating. The method comprises determining a number of the certificates that require updating. The method comprises requesting updates for each of the certificates that require updating when the number is at most a preset number and sets a timer to a first time duration. The method comprises requesting updates for up to the preset number of the certificates that require updating when the number is greater than the preset number and sets the timer to a second time duration.

20 Claims, 2 Drawing Sheets

DEVICE AND METHOD FOR UPDATING A CERTIFICATE

PRIORITY CLAIM

This application claims the priority to the U.S. Provisional Application Ser. No. 61/057,692, entitled "Device and Method for Updating a Certificate," filed May 30, 2008. The specification of the above-identified application is incorporated herewith by reference.

BACKGROUND INFORMATION

A certificate may be used to transmit data from a first computing device to a second computing device. The certificate may be part of a security arrangement where the data is encrypted by the first computing device and decrypted by the second computing device. One requirement of the certificate is that a key is used between the first and second computing terminals. The key may be a common algorithm used by the first and second computing devices where the encryption is a first direction of the algorithm and the decryption is a reverse direction of the algorithm. In this case, the key must be securely shared between the first and second computing devices to ensure the security arrangement is maintained. The key may also be a public key and a private key pair. The public key may be known by any transmitting device such as the first computing device to encrypt the data. The private key may be known only by a receiving computing device such as the second computing device to decrypt the data. In this case, the public key is not required to be securely shared since the public key is not configured to perform any function other than to encrypt the data while the private key is only known by the receiving computing device. Other security arrangements may be implemented so that only intended recipients are capable of decrypting the data. However, in any of the security arrangements, the certificate used by the recipient must be known so that the data may be properly encrypted.

SUMMARY OF THE INVENTION

Figure 1:
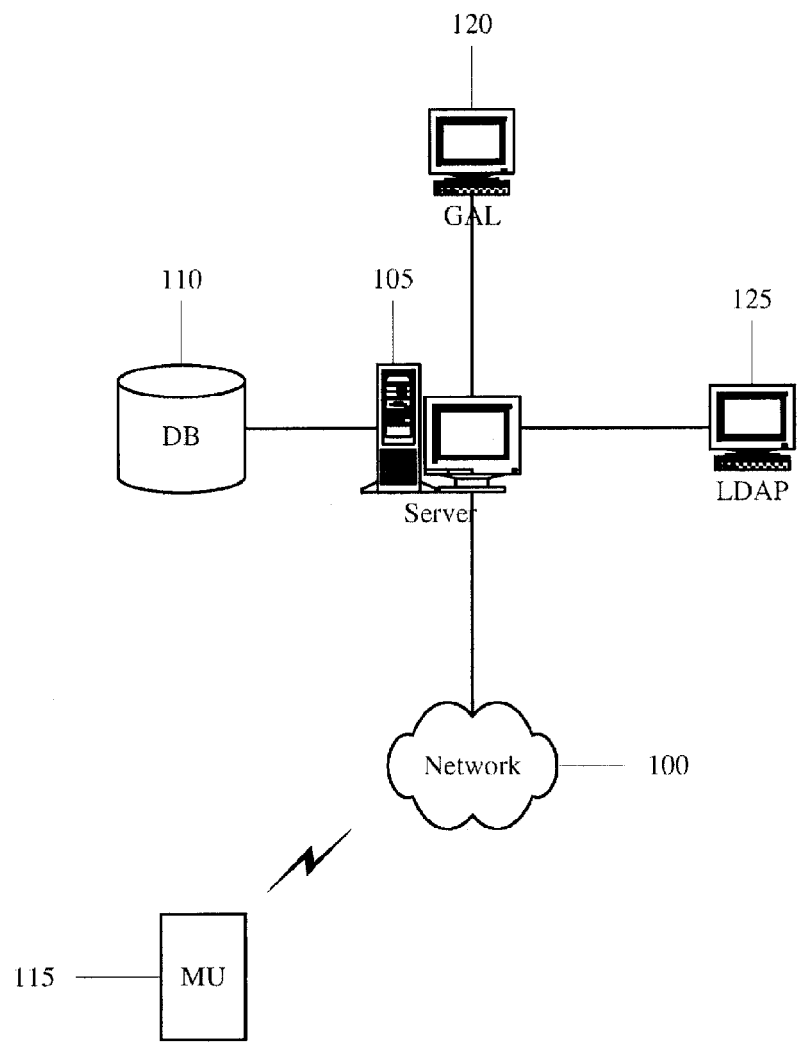
FIG. 1 shows a network for updating certificates according to an exemplary embodiment of the present invention.

The present invention relates to a device and method for updating a certificate. The method updates certificates for potential recipients by determining whether the certificates require updating. The method determines a number of the certificates that require updating. The method requests updates for each of the certificates that require updating when the number is at most a preset number and sets a timer to a first time duration. The method requests updates for up to the preset number of the certificates that require updating when the number is greater than the preset number and sets the timer to a second time duration.

DETAILED DESCRIPTION

The exemplary embodiments of the present invention may be further understood with reference to the following description and the appended drawings, wherein like elements are referred to with the same reference numerals. The exemplary embodiments of the present invention describe a system and method for updating certificates. A current version of a certificate may ensure that a proper encryption method is used prior to transmission of data to a recipient. According to the exemplary embodiments of the present invention, a client application of the transmitting device updates certificates for potential recipients automatically. The certificate, the client application, the updating, and an associated method will be discussed in more detail below.

The exemplary embodiments of the present invention illustrate that the transmitting device that requires updating is a mobile unit (MU). However, those skilled in the art will understand that the exemplary embodiments of the present invention may be applied to any computing device including mobile and stationary devices (e.g., desktop computer).

FIG. 1 shows a network 100 for updating certificates according to an exemplary embodiment of the present invention. The network 100 may be any communications arrangement in which at least two computing devices are capable of communicating with each other. For example, the network 100 may be a local area network (LAN), a wireless local area network (WLAN), a private area network (PAN), a wide area network (WAN), etc. The network 100 may include a server 105 and a database 110. Within an operating area of the network 100 may be a MU 115.

The server 105 may be configured to be responsible for the operations occurring within the network 100. The database 110 may store data relating to the network 100 such as association lists. In particular, according to a first exemplary embodiment of the present invention, the database 110 may store most current certificates associated with potential recipients. The network 100 may further include other network components such as a switch to direct data appropriately, access points (AP) to extend the operating area of the network 100, a network management arrangement (NMA), etc. Those skilled in the art will understand that the components of FIG. 1 are only exemplary and that the functionality described herein of the components may reside in other devices. For example, the functionality described for the server 105 may reside in some other network node such as a switch or router. In addition, the functionality described as residing in a single device may reside in multiple devices. For example, the database 110 may by distributed to a plurality of network devices.

The MU 115 may be any mobile computing device such as a mobile computer, a personal digital assistant (PDA), a laptop, an RFID reader, a scanner, an image capturing device, a pager, etc. However, as discussed above, the MU 115 may also represent any computing device including stationary devices. The MU 115 may be disposed within an operating area of the network 100 and, thus, communicatively connected with the server 105. Accordingly, the MU 115 may include a transceiver and an antenna to exchange data with the network 100. According to the exemplary embodiments of the present invention, the MU 115 may be a transmitting device that has the capability of encrypting data prior to transmission. The encryption may be any known method.

According to the exemplary embodiments of the present invention, the MU 115 may transmit data to another computing device. Furthermore, the data may be encrypted so that only the intended recipient is capable of decrypting the data. The security arrangement for the secure transmission of data may be determined by a certificate. In order to properly encrypt the data so that the intended recipient computing device is configured to decrypt the data, the specifications of the certificate utilized by the recipient is also used by the MU 115. For example, if the certificate of the recipient includes a secure key, the secure key may be shared with the MU 115. In another example, if the certificate of the recipient includes a public key, the public key may be shared with the MU 115.

The MU 115 may include a client application that performs the encryption according to the specifications of the certificate. According to the exemplary embodiments of the present invention, the client application may also be configured to determine the appropriate certificate and, thus, the appropriate encryption method. The client application may further be configured to update the certificate to prevent an obsolete certificate from being used so that data is not improperly encrypted that causes a recipient to improperly or not be capable of decrypting the data. The client application may update the certificates for potential recipients at different times. The times will be discussed in further detail below, in particular with reference to FIG. 2.

The client application may identify the appropriate certificate from a variety of locations. According to a first exemplary embodiment of the present invention, the database 110 may store a recipient identity of a certificate. According to a second exemplary embodiment of the present invention, a memory of the MU 115 may store substantially similar data so that the identifying may be performed locally. According to a third exemplary embodiment of the present invention, a database of further servers such as a Global Address List (GAL) server 120 or a Lightweight Directory Access Protocol (LDAP) server 125 may store substantially similar data. The client application of the MU 115 may contact any of these sources to access the respective storage device when identifying the appropriate certificate for the recipient identity.

The client application may access any of the above described databases to identify the certificate. The client application may be configured with an order for accessing the databases. For example, the client application may be configured to attempt to use a least amount of processing to identify the certificate. In such an exemplary embodiment, the client application may first attempt to identify the certificate locally by accessing the memory of the MU 115 and proceed with accessing the GAL server 120 and then the LDAP server 125. If the client application is aware that the identity of the receiving device is new and, thus, the identity of the certificate is not stored in the memory of the MU 115, the client application may bypass accessing the memory of the MU 115 and access the GAL server 120 and the LDAP server 125.

Once the identity of the certificate is determined, the client application may encrypt the data to be transmitted. The encrypted data may be transmitted via the network 100 to a computing device associated with the recipient identity. For example, if the receiving computing device is connected to network 100, the encrypted data may be transmitted via the network 100 to the switch that routes the encrypted data to the receiving computing device. In another example, if the receiving computing device is connected to a different network, the encrypted data may be transmitted via the network 100 to the further communications network that routes the encrypted data to the receiving computing device.

The receiving computing device may receive the encrypted data. Because the data is encrypted according to the certificate utilized by the receiving device, the data may be decrypted using an appropriate algorithm (e.g., cipher) of the certificate.

As discussed above, an obsolete certificate may result in an improper encryption of data. The obsolete certificate may be, for example, an outdated version of a more current certificate, a different certificate than that used currently by the recipient, etc. In any of the cases of an obsolete certification, an improper encryption of data according to the specifications of the obsolete certificate may prevent a recipient from decrypting the data.

According to the exemplary embodiments of the present invention, the client application of the MU 115 may further be configured to update the certificates of the potential recipients. The client application may include (or have access to) a database indicating the certificate associated with each of the potential recipients. As discussed above, the MU 115 may connect to various servers such as the server 105, the GAL server 120, and the LDAP server 125. These servers may include a most current certificate for potential recipients included therein. The client application may verify each of the potential recipients of the MU 115 using a respective identity datum. The servers may include association data relating to the identity datum indicating the certificate associated with the potential recipient. When the client application determines the certificate associated with the potential recipient, the determined certificate may be verified with the certificate association at the server. If a discrepancy arises such as a different version or a different type of certificate, the client application becomes aware that an update is required.

It should be noted that when the client application accesses the various databases to verify that the certificate is a most current one, the client application may find that a different version of the certificate that relates to the recipient identity may be stored in the databases. For example, the database 110 may include a first version of the certificate; the GAL server 120 may include a second version of the certificate; the LDAP server 125 may include a third version of the certificate; etc. Each database including the certificate data may further include a time parameter indicating when the update to the respective database occurred. The client application may determine which of the databases includes a most current version of the certificate for the recipient identity. Subsequently, the client application may be aware of which database to base the update to the certificate.

According to the exemplary embodiments of the present invention, the process of updating the certificates may be automatic. Upon the expiration of a predetermined time period (e.g., a hardware or software timer expiration), a server (e.g., server 105, GAL server 120, LDAP server 125, etc.) may be contacted to determine whether the updates are required. Since the updating is automatic, to mitigate a processing requirement, the client application may include a preset number that indicates a maximum number of updates to request in a given session. That is, a request for a number of updates beyond the preset number may increase the processing requirement to a level that affects performance of the MU 115.

The following description includes various time durations in which the client application determines when a number of updates are to occur. A first may be a remaining time duration. The remaining time duration relates to a time in which a certificate remains valid. Those skilled in the art will understand that a certificate may have a time period in which the certificate may be used. Upon the time period lapsing, the certificate may be updated or altered as a security measure. A remaining time period of the validity of the certificate may be represented as the remaining time period (hereinafter "$T_{remaining}$"). A second may be a preset time duration. The preset time duration relates to a predetermined time used by the client application. The preset time duration may be determined using a variety of factors such as a bandwidth allocation available for updating certificates, a number of assets associated with the network, etc. The determined time may be dynamic to adjust for the variety of factors and may be represented as the preset time duration (hereinafter "$T_{preset}$").

The client application may determine the number of updates required. If the number of updates is below the preset number, a request to the server may be transmitted for all the necessary updates. After the request is transmitted, the client application may set the timer to a determined duration. Upon expiration of the determined duration, the server may again be contacted to determine whether updates are necessary. According to the exemplary embodiments of the present invention, the client application may determine the duration by selecting the smaller value of $T_{remaining}$ and $T_{preset}$. Those skilled in the art will understand that, for example, the LDAP server 125 may indicate a duration in which a certificate is valid. When the client application accesses the LDAP server 125 to determine whether a certificate is valid, the client application may also determine the $T_{remaining}$. If $T_{remaining}$ for any checked certificate is less than $T_{preset}$, the client application may set the timer to $T_{remaining}$. Accordingly, if $T_{remaining}$ for any checked certificate is greater than $T_{preset}$, the client application may set the timer to $T_{preset}$. Therefore, depending on the conditions, the client application may set the timer to either $T_{remaining}$ or $T_{preset}$ (hereinafter "$T_{short}$").

If the number of updates is above the preset number, a request to the server may be transmitted for a number of updates totaling the preset number. After the request is transmitted, the client application may set the timer to $T_{short}$. Upon expiration of $T_{short}$, it may automatically be determined that updates are required since the number of updates in a previous run indicated that the number was greater than the preset number. Thus, the client application may contact the server again to request a number of updates not to exceed the preset number. This process may be repeated until all the updates have been requested. Accordingly, a final repeating of the above may result in the number of updates being less than the preset number.

As discussed above, $T_{short}$ may be determined to be a particular length to enable the client application to update the certificates in a shorter amount of time. When the number of updates is less than the preset number, no further updates are required after requesting for the current number of updates. The client application may set the timer to be a final time duration (hereinafter "$T_{final}$"). $T_{final}$ may be predetermined to be a set number. The $T_{final}$ may be a longer duration than $T_{remaining}$ and $T_{preset}$ that may free processing power to be utilized by the MU 115 for other functionalities while no further updates are required.

It should be noted that the client application may set the timer after the updates to the certificates are completed to be a shorter value between $T_{final}$ and $T_{remaining}$. For example, there may be scenarios where it is determined that no further updates are required. However, one $T_{remaining}$ of the certificates may be determined to be shorter than $T_{final}$. In such a scenario, the client application may set the timer to $T_{remaining}$ since the client application may be aware that after $T_{remaining}$, an update is required.

Figure 2:
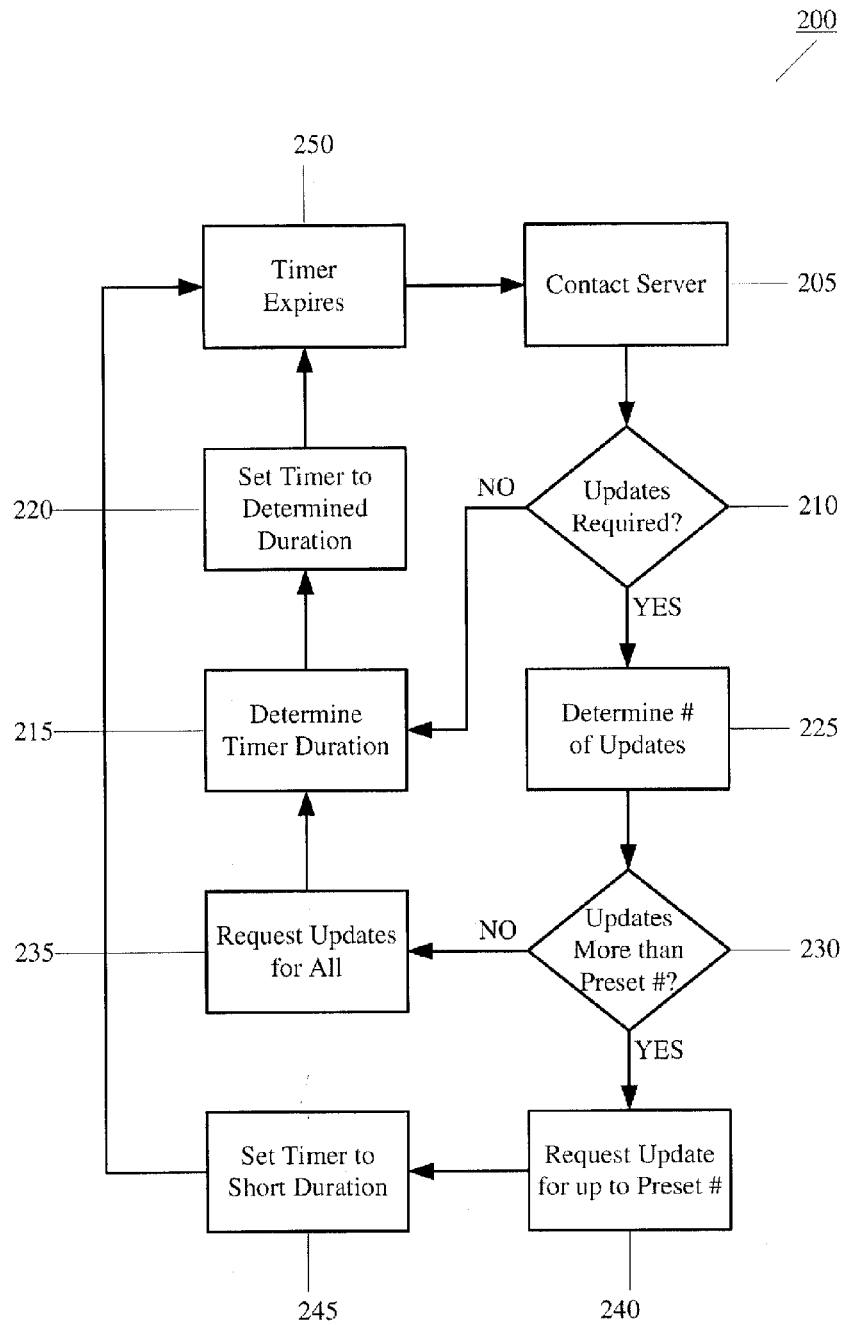
FIG. 2 shows a method for updating certificates according to an exemplary embodiment of the present invention.

FIG. 2 shows a method 200 for updating certificates according to an exemplary embodiment of the present invention. The method 200 will be described according to a client application of a computing device that is used to transmit encrypted data. The method 200 will be described with reference to the network 100 of FIG. 1. The method 200 will also be described using the durations $T_{remaining}$, $T_{preset}$, $T_{short}$, and $T_{final}$ as described above.

It should be noted that the method 200 assumes that the MU 115 is activated and connected to the network 100. Furthermore, it is also assumed that the method 200 is a continuous process and the start of the method 200 is part of the continuous process. However, the method 200 may include additional steps regarding an initial updating of certificates. Exemplary additional steps will be described in further detail below.

In step 205, a server is contacted. As discussed above, the server may be, for example, the server 105, the GAL server 120, the LDAP server 125, etc. Once the server is contacted, the client application may access a database of the server including association data between a potential recipient and a certificate. It should be noted that when the authentication application contacts the server 105, the server 105 may contact the LDAP server 125 to receive requested data relating to a current certificate used by a recipient. When the server 105 is contacted, the server 105 and/or the GAL server 120 may also be updated. Thus, the server 105 and the GAL server 120 may include updated certificate data.

In step 210, a determination is made whether at least one update is required. The update may relate to whether an indicated certificate in a database of the client application for a potential recipient is obsolete. As discussed above, the obsolete certificate may be when the indicated certificate in the database is an older version, a different type of the certificate, or when the certificate is no longer valid.

If step 210 determines that no updates are required (i.e., all indicated certificates in the database of the client application are current), the method 200 continues to step 215 where a time duration is determined. As discussed above, the time duration may be determined by selecting a shorter value between $T_{final}$ and $T_{remaining}$ for each checked certificate. Thus, if $T_{final}$ is shorter than $T_{remaining}$ for each certificate, the client application may set the timer to $T_{final}$. Accordingly, if at least one $T_{remaining}$ is shorter than $T_{final}$, the client application may set the timer to $T_{remaining}$. In step 220, a timer is set to the determined duration.

If step 210 determines that at least one update is required, the method 200 continues to step 225. In step 225, a number of updates is determined. In step 230, a determination is made whether the number of updates that are required is greater than a preset number. As discussed above, the preset number may be determined by a minimal use of processing power of the MU 115 to prevent a hindrance in the performance of the MU 115. It should be noted that the preset number may be an arbitrary number that is determined and entered manually or set automatically based on the particular type of MU.

If step 230 determines that the number of updates is less than or equal to the preset number, the method 200 continues to step 235 where a request is made to the server by the client application for all the updates. Upon making the request, the server may transmit the updates when available. Upon transmitting the request, the method 200 continues to step 215 where the timer duration is determined and set (step 220).

If step 230 determines that the number of updates is more than the preset number, the method 200 continues to step 240 where a request is made to the server by the client application for a number of updates that does not exceed the preset number. Upon making the request, the server may transmit the requested updates when available. Upon transmitting the request, the method 200 continues to step 245 where the timer is set to $T_{short}$. Because the client application is aware that further updates are required, the timer may be set to $T_{short}$ as discussed above.

After setting the timer in either step 220 or step 245, the method 200 continues to step 250 where the client application waits for the timer to expire. Prior to contacting the server in step 205, in a preferred embodiment, the client application may determine whether the requested updates have been received. If the updates have been received, the method 200 may continue. If the updates have not been received, the method 200 may pause until the updates have been received. If the updates have not been received from the prior updating steps, a repetitious determination is made for the requested updates. Upon receiving the updates, the client application may store the updated certificates.

When the timer is set to $T_{short}$, the client application may already be aware that further updates are required. Thus, when the method 200 repeats, the client application may bypass step 210. In the repeated step 225, the number of updates that is determined may be the number of updates determined during the first run through step 225 less the preset number. As long as the number of remaining updates is greater than the preset number, this process may be repeated until the number of remaining updates is less than the preset number, thereby continuing the method 200 through steps 235 to step 215, etc.

It should be noted that the method 200 may include additional steps. For example, the client application may include a prompt requesting if various certificates are to be updated. The manual verification of updating the certificates may be an option set by the user of the MU 115. Otherwise, as a default or if selected, the client application may execute the method 200 in the background automatically without requiring inputs from the user. When the prompt is shown, after step 215, the client application may request if a particular certificate is to be updated for a particular potential recipient. When a certificate is not to be updated, a further prompt may request if the potential recipient is to be deleted.

As discussed above, the client application may perform an initial determination whether the certificates are to be updated. The initial updating of the certificates may be performed at a variety of times such as upon activation of the MU 115, upon connection to the server, upon manually opening the client application, prior to a transmission of data to a recipient, etc. The initial updating may go through the steps described above for the method 200. However, the first pass at step 205 may be skipped as no timer has been set or is required. After the initial updating, the method 200 may repeat until the MU 115 has been deactivated, the MU 115 is no longer connected to the network 100, etc.

The exemplary embodiments of the present invention enable a user of a MU to have the latest certificate for a potential recipient of data to be transmitted by the MU. Having the latest certificate enables a proper encryption of the data for the recipient to properly decrypt. The client application of the MU may automatically perform the updating of the certificates in the database therein. For example, the client application may run in the background to constantly update the certificates in a manner that does not impede on the use of the MU itself. In another example, the client application may be instructed by the user of the MU to update the certificates.

Those skilled in the art will understand that the above described exemplary embodiments may be implemented in any number of manners, including, as a separate software module, as a combination of hardware and software, etc. For example, the client application may be a program containing lines of code that, when compiled, may be executed on a processor of the MU 115.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method for updating certificates for potential recipients, comprising:
   a) determining whether the certificates require updating;
   b) determining a number of the certificates that require updating;
   c) requesting updates for each of the certificates that require updating and setting a timer to a first time duration when the number is at most a preset number; and
   d) requesting updates for up to the preset number of the certificates that require updating and setting the timer to a second time duration when the number is greater than the preset number.

2. The method of claim 1, further comprising:
   e) repeating steps a)-d) when the timer expires.

3. The method of claim 1, wherein the first time duration is determined as a lesser value between a preset duration and a smallest remaining valid duration for each of the certificates.

4. The method of claim 1, wherein a) is performed by at least one of a local search and a remote search.

5. The method of claim 4, wherein the local search includes accessing a memory of a computing device that is performing the updating of the certificates.

6. The method of claim 4, wherein the remote search includes at least one of a global access list (GAL) and a lightweight directory access protocol (LDAP).

7. The method of claim 4, wherein the local search and the remote search are performed in a predetermined order.

8. The method of claim 4, wherein the local search and the remote search determine that there is at least two newer versions of one of the certificates that require updating.

9. The method of claim 8, further comprising:
   selecting one of the at least two newer versions that is a most current update of the certificate.

10. The method of claim 1, wherein the preset number is determined as a function of a minimum processing requirement.

11. A device, comprising:
    a memory including association data relating to recipients and a respective certificate for each of the recipients; and
    a processor executing a client application, the client application determining whether the certificates require updating, the client application determining a number of the certificates that require updating, the client application requesting updates for each of the certificates that require updating and setting a timer to a first time duration when the number is at most a preset number, the client application requesting updates for up to the preset number of the certificates that require updating and setting the timer to a second time duration when the number is greater than the preset number.

12. The device of claim 11, wherein the client application repeats the determining and the requesting steps when the timer expires.

13. The device of claim 11, wherein the first time duration is determined as a lesser value between a preset duration and a smallest remaining valid duration for each of the certificates.

14. The device of claim 11, wherein the requesting is further performed by a remote search.

15. The device of claim 14, wherein the remote search includes at least one of a GAL and a LDAP.

16. The device of claim 14, wherein an accessing of the association data of the memory and the remote search are performed n a predetermined order.

17. The device of claim 14, wherein an accessing of the association data of the memory and the remote search determine that there is at least two newer versions of one of the certificates that require updating.

18. The device of claim 17, wherein the client application selects one of the at least two newer versions that is a most current update of the certificate.

19. The device of claim 11, wherein the preset number is determined as a function of a minimum processing requirement that prevents an affect of performance of the device.

20. A non-transitory computer readable storage medium including a set of instructions executable by a processor, the set of instructions for associating a certificate with a first recipient identity operable to:
  a) determine whether the certificates require updating;
  b) determine a number of the certificates that require updating;
  c) request updates for each of the certificates that require updating and setting a timer to a first time duration when the number is at most a preset number, the first time duration being determined as a lesser value between a preset duration and a smallest remaining valid duration for each of the certificates; and
  d) request updates for up to the preset number of the certificates that require updating number and setting the timer to a second time duration when the number is greater than the preset number.

* * * * *